(12) United States Patent
Hou et al.

(10) Patent No.: US 8,235,607 B2
(45) Date of Patent: Aug. 7, 2012

(54) CAMERA MODULE

(75) Inventors: Sheng-Hung Hou, Taipei Hsien (TW); Yen-Liang Tung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/973,915

(22) Filed: Dec. 21, 2010

(65) Prior Publication Data
US 2012/0039596 A1   Feb. 16, 2012

(30) Foreign Application Priority Data
Aug. 12, 2010   (CN) .......................... 2010 1 0251933

(51) Int. Cl.
*G03B 17/00* (2006.01)
(52) U.S. Cl. ...................................................... 396/529
(58) Field of Classification Search .................. 396/529, 396/535
See application file for complete search history.

(56) References Cited

U.S. PATENT DOCUMENTS

| | | | |
|---|---|---|---|
| 7,665,915 B2* | 2/2010 | Lee ................................. | 396/529 |
| 7,934,879 B2* | 5/2011 | Liao et al. ...................... | 396/529 |
| 8,009,979 B2* | 8/2011 | Shirono ......................... | 396/535 |
| 2006/0119948 A1* | 6/2006 | Matsumoto et al. .......... | 359/624 |
| 2008/0237768 A1* | 10/2008 | Yajima et al. ................. | 257/434 |
| 2010/0175850 A1* | 7/2010 | Kaucic et al. .................. | 165/59 |

* cited by examiner

*Primary Examiner* — W. B. Perkey
(74) *Attorney, Agent, or Firm* — Altis Law Group, Inc.

(57) ABSTRACT

A camera module includes a substrate, a holder, and a dustproof member. The holder is mounted on the substrate. The holder also defines an air vent. The dustproof member includes a permeable portion. The permeable portion is made of air-permeable material. The permeable portion shields the air vent. The dustproof member can also be made of a porous material plugging the air vent.

14 Claims, 5 Drawing Sheets

CAMERA MODULE

BACKGROUND

1. Technical Field

The present disclosure relates to image capture, and more particularly, to a camera module used for an electronic device.

2. Description of Related Art

Camera modules are widely used in electronic devices such as personal digital assistants, mobile phones, portable computers, and other image capturing devices.

A typical camera module includes a substrate, a holder, and a lens barrel received in the holder. The holder defines an air vent. The holder is mounted on the substrate by thermoplastic adhesive bond film, and the pressure of an interspace defined between the holder and the substrate is regulated by the air vent during assembly of the holder and the substrate. After the assembly of the holder and the substrate, the air vent is sealed with glue, such as epoxy, to keep dust particles out.

However, the camera module is isolated from the ambient environment, and air pressure of the interspace can increase with increased temperature of the camera module during use. As a result, components of the camera module are prone to displacement, with image quality affected accordingly.

Therefore, there is room for improvement within the art.

BRIEF DESCRIPTION OF THE DRAWINGS

The components in the drawings are not necessarily drawn to scale, the emphasis instead being positioned upon clearly illustrating the principles of the present disclosure. Moreover, in the drawings, like reference numerals designate corresponding parts throughout the views.

DETAILED DESCRIPTION

Figure 1:
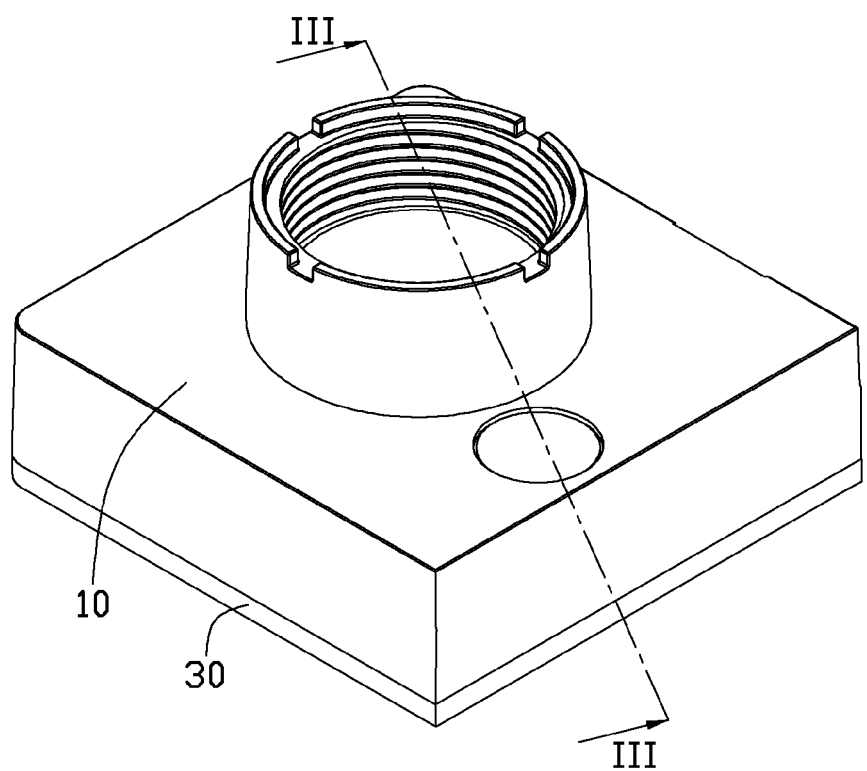
FIG. 1 is an isometric, assembled view of a first embodiment of a camera module.
Figure 2:
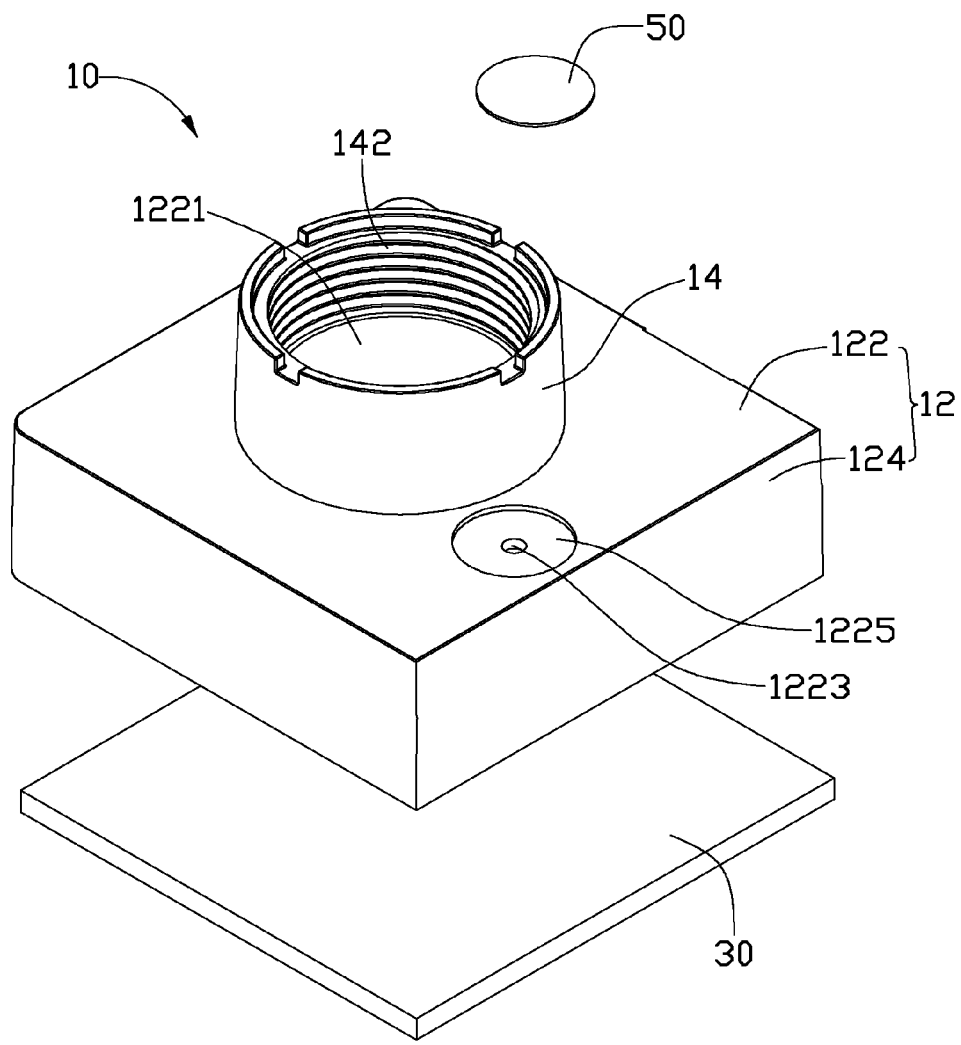
FIG. 2 is an exploded, isometric view of the camera module of FIG. 1.

Referring to FIG. 1 and FIG. 2, a first embodiment of a camera module 100 includes a holder 10, a substrate 30, and a dustproof member 50. The holder 10 is mounted on the substrate 30.

Figure 3:
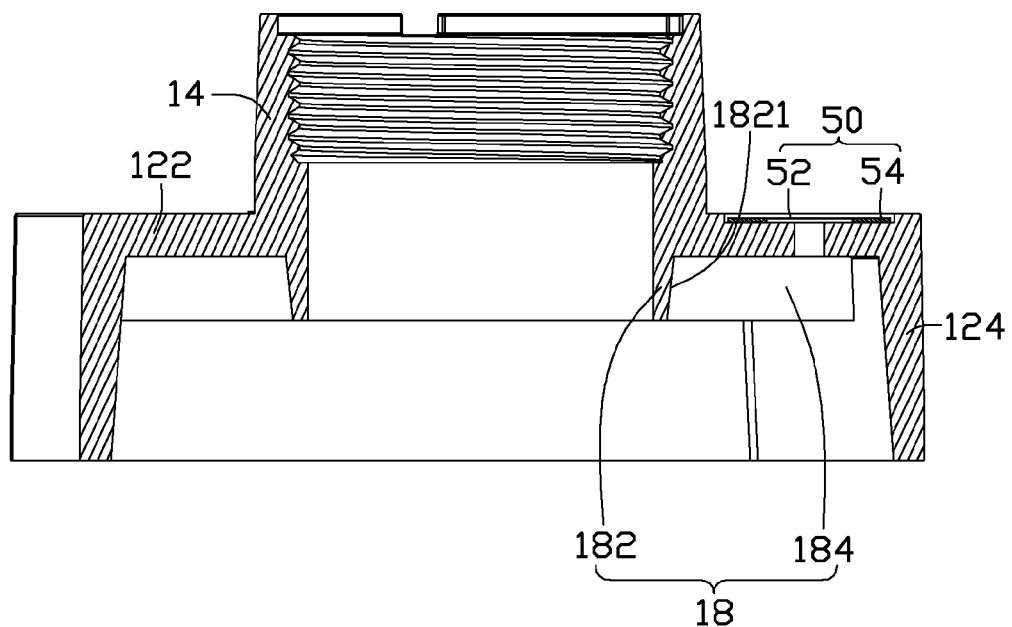
FIG. 3 is a cross section of the camera module of FIG. 1, taken along the line III-III.

Referring also to FIG. 3, the holder 10 includes a receiving portion 12, a mounting portion 14, and a reinforcing portion 18. The receiving portion 12 includes a support board 122 and a plurality of sidewalls 124. The support board 122 can be substantially rectangular. The receiving portion 122 includes four sidewalls 124 extending from four edges of the support board 122. The support board 122 defines a through hole 1221 corresponding to the mounting portion 14, and an air vent 1223. The through hole 1221 is substantially defined at a center of the support board 122. The support board 122 further defines a receiving groove 1225 depressed from the support board 122. The air vent 1223 is defined at a bottom surface of the receiving groove 1225 adjacent to the through hole 1221, and penetrates the support board 122.

The mounting porting 14 can be substantially a hollow cylinder. The mounting portion 14 extends to the support board 122 and from an edge of the through hole 1221. The mounting portion 14 and the sidewalls 124 are at the opposite sides of the support board 122. The mounting portion 14 forms an inner thread 142 therein.

Figure 4:
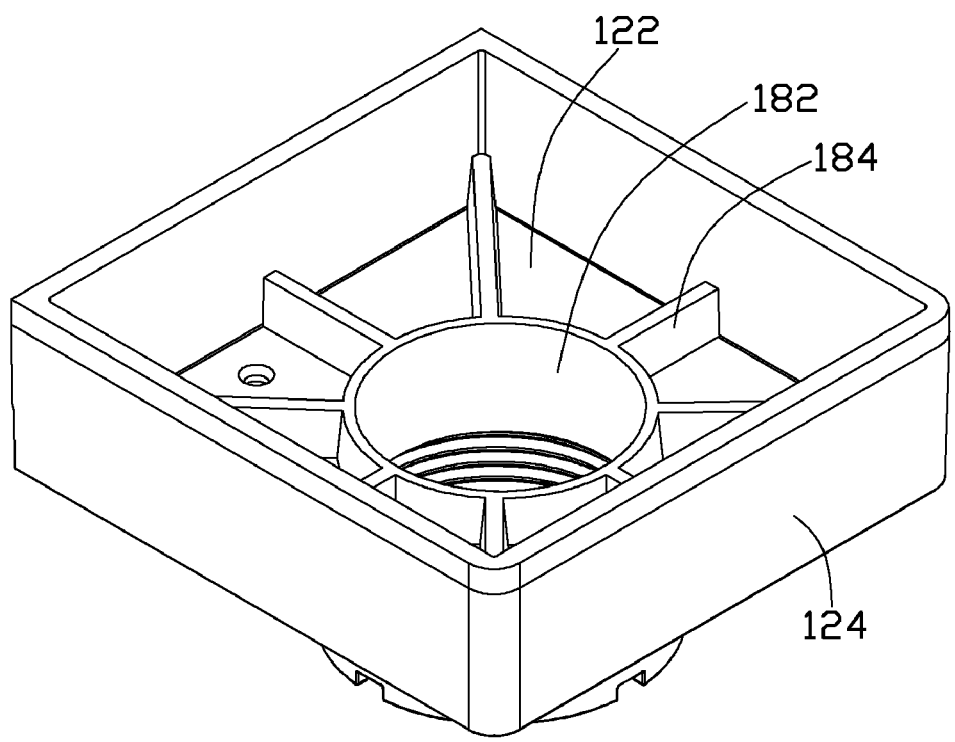
FIG. 4 is similar to FIG. 1, but viewed from another aspect.

Referring also to FIG. 4, the reinforcing portion 18 is formed at a side of the support board 122 away from the mounting portion 14, and received in the receiving portion 12. The reinforcing portion 18 includes a connecting rib 182 and a plurality of reinforcing ribs 184. The connecting rib 182 is substantially a hollow cylinder. The connecting rib 182 extends from the edge of the through hole 1221 toward the support board 122. The plurality of reinforcing ribs 184 uniformly extends from an outer surface (not labeled) of the connecting rib 182 and connects to the sidewalls 124 and the support board 122.

The substrate 30 can be substantially a rectangular board, and fixed to ends of the sidewalls 124 away from the support board 122.

The dustproof member 50 can be substantially circular, and corresponds in shape to the receiving groove 1225. The dustproof member 50 includes an permeable portion 52 and a fixing portion 54. The permeable portion 52 is substantially circular, and made of air-permeable materials, such as nonwoven fabric. The fixing portion 54 is substantially annular, and extends from an edge of the permeable portion 52 to surround the permeable portion 52. The fixing portion 54 is substantially coplanar with the permeable portion 52. In the illustrated embodiment, the fixing portion 54 is a bonding film, such as a double-sided adhesive tape or a thermoplastic adhesive bonding film. The dustproof member 50 is received in the receiving groove 1225, and the permeable portion 52 shields the air vent 1223. The fixing portion 54 adheres to the bottom surface of the receiving groove 1225.

In use, a lens barrel (not shown) is threaded into the inner thread 142 of the mounting portion 14. The permeable portion 52 of the dustproof member 50 regulates ventilation between the ambient environment and an interspace defined between the holder 10 and the lens barrel. The air pressure in the interspace remains equal to the ambient environment, thus components received in the holder 10 does not move and the holder 10 is prevented from deforming. Moreover, since the permeable portion 52 regulates ventilation between the ambient environment and an interspace defined between the holder 10 and the lens barrel, the cameral module 100 also prevents condensation in the holder 10 and dust particles from entering the interspace to optimize image quality and service life.

Alternatively, the receiving groove 1225 may be omitted, whereby the dustproof member 50 is fixed to the support board 122 directly. The dustproof member 50 is not limited to fixing to a side of the support board 122 away from the sidewalls 124. The fixing portion 54 may be fasteners rather than a bonding film, as long as the permeable portion 52 can be fixed to the support board 122 by the fixing portion 54. The air vent 1223 may be defined at the sidewalls 124 rather than the support board 122. The reinforcing portion 18 may be omitted.

Figure 5:
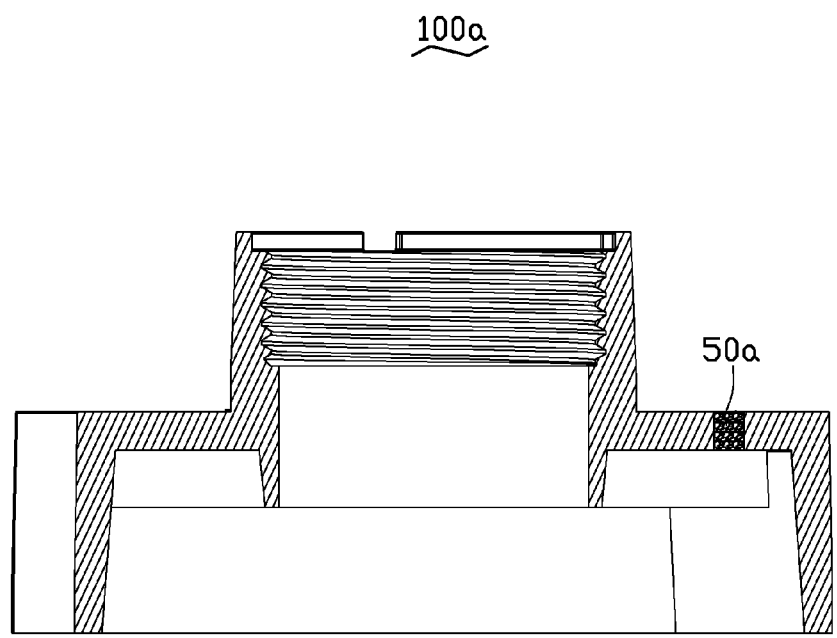
FIG. 5 is a cross section of a second embodiment of a camera module.

Referring to FIG. 5, a second embodiment of a camera module 200 differs from the first embodiment of the camera module 100 only in that the dustproof member 50a corresponds in shape to the air vent (not labeled), and plugs in the air vent. The dustproof member 50a may be made of porous material, such as porous metallic material or porous silicon.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A camera module, comprising:
   a substrate;
   a holder mounted on the substrate, the holder defining an air vent; and
   a dustproof member comprising a permeable portion made of air permeability material, wherein the permeable portion shields the air vent;
   wherein the holder comprises a support board, a plurality of sidewalls, and a reinforcing portion, the support board defines a through hole, the plurality of sidewalls extend downwards from respective edges of the support board, the reinforcing portion comprises a tubular connecting rib and a plurality of plate-shaped reinforcing ribs, the connecting rib extends downwards from an edge of the through hole, the reinforcing ribs radially extend out from an outer surface of the connecting rib to the sidewalls, respectively.

2. The camera module of claim 1, wherein the dustproof member further comprises a fixing portion to fix the dustproof member to the holder, and the fixing portion extends from an edge of the permeable portion to surround the permeable portion.

3. The camera module of claim 2, wherein the fixing portion is bonding film.

4. The camera module of claim 1, wherein the holder comprises a receiving portion and a mounting portion for a lens barrel, the mounting portion extends from the receiving portion, and the air vent is defined in the receiving portion.

5. The camera module of claim 4, wherein the receiving portion comprises the support board and the plurality of sidewalls, the mounting portion extends from the support board and aligns with the edge of the through hole, and the mounting portion and the plurality of sidewalls are at opposite sides of the support board.

6. The camera module of claim 5, wherein the air vent is defined in one of the support board and the plurality of sidewalls.

7. The camera module of claim 4, wherein the support board further defines a receiving groove in a surface opposite to the plurality of sidewalls, and the dustproof member is received in the receiving portion.

8. The camera module of claim 1, wherein the permeable portion is made of non-woven fabric.

9. A camera module, comprising:
   a substrate;
   a holder mounted on the substrate, the holder defining an air vent; and
   a dustproof member made of porous material, wherein the dustproof member plugs the air vent;
   wherein the holder comprises a support board, a plurality of sidewalls, and a reinforcing portion, the support board defines a through hole, the plurality of sidewalls extend downwards from respective edges of the support board, the reinforcing portion comprises a tubular connecting rib and a plurality of plate-shaped reinforcing ribs, the connecting rib extends downwards from an edge of the through hole, the reinforcing ribs radially extend out from an outer surface of the connecting rib to the sidewalls, respectively.

10. The camera module of claim 9, wherein the holder comprises a receiving portion and a mounting portion for a lens barrel, the mounting portion extends from the receiving portion, and the air vent is defined in the receiving portion.

11. The camera module of claim 10, wherein the receiving portion comprises the support board and the plurality of sidewalls, the mounting portion extends from the support board, and the mounting portion and the at least one sidewall are at opposite sides of the support board.

12. The camera module of claim 11, wherein the air vent is defined in one of the support board and the plurality of sidewalls.

13. The camera module of claim 9, wherein the dustproof member is made of porous metallic material.

14. The camera module of claim 9, wherein the dustproof member is made of porous silicon.

* * * * *